Aug. 22, 1967 R. GRANDPERRET 3,337,659
METHOD OF PRODUCING MOLD ELEMENTS FOR LENSES
Original Filed June 12, 1958
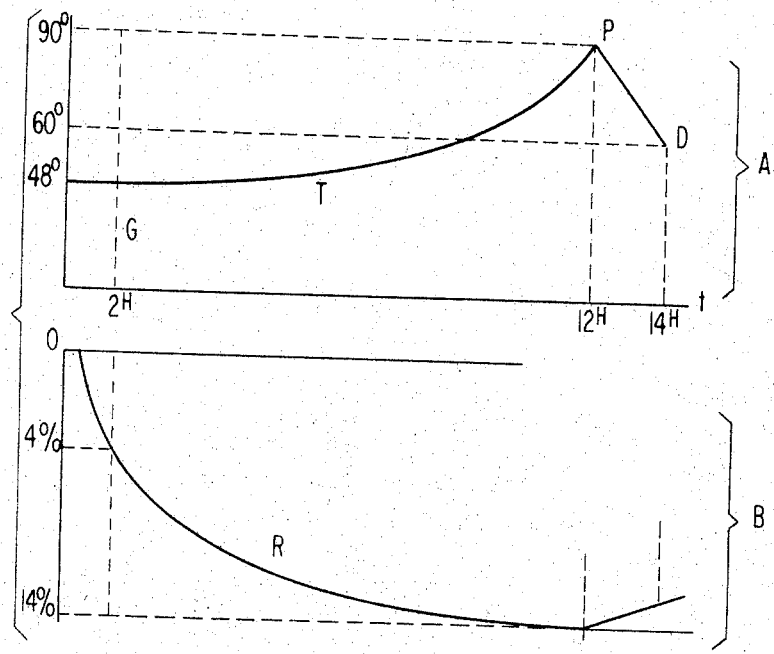
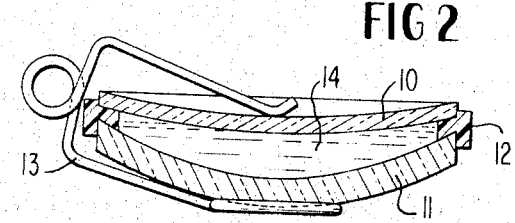
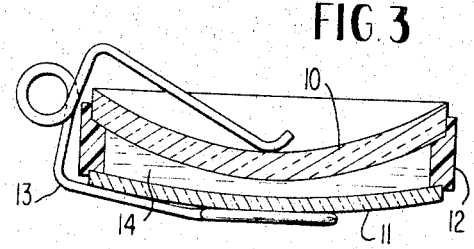
INVENTOR
RENE GRANDPERRET
BY Young & Thompson
ATTORNEYS

3,337,659
METHOD OF PRODUCING MOLD ELEMENTS FOR LENSES

Rene Grandperret, Saint-Maur, France, assignor to Lentilles Ophlalmiques Speciales, Societe Anonyme, Saint-Maur, Seine, France, a corporation of France
Original application June 12, 1958, Ser. No. 741,629, now Patent No. 3,278,654, dated Oct. 11, 1966. Divided and this application Oct. 22, 1965, Ser. No. 502,157
Claims priority, application France, Apr. 25, 1958, 764,067, Patent 1,204,627
2 Claims. (Cl. 264—1)

The present application is a division of my copending application Ser. No. 741,629, filed June 12, 1958.

As also in that copending application, the present invention relates to improvements in the production of optical and ophthalmic lenses from transparent thermosettable resins. The usual procedure in producing such lenses had been to pour the monomer resin into molds, usually glass molds, and then heat the filled molds to a predetermined temperature to polymerize the resin.

One difficulty that had arisen in connection with such methods in the prior art was that the resins which were used contracted substantially during polymerization. By virtue of the configuration of the lens, however, such contraction was nonuniform between the center and the periphery of the lens. In the case of a positive lens, this uneven contraction caused a breakage of the molds; and with a negative lens, it caused separation, thereby deforming the lens and permitting the entry of air into the mold, which interrupted the polymerization process prior to its normal completion. The resulting lens had to be discarded since no deviation from the prescribed contour of the lens could be tolerated for optical purposes.

According to the invention of my copending application, the difficulties of the prior art were overcome by the use of quenched glass molds having thin walls with parallel faces, for the purposes and with the results set forth in greater detail in that copending application.

By quenched glass, I intend to designate glass that has been carried to a temperature of about 700° C. and then quickly cooled to ambient temperature by a jet of air or the like. Glass treated in this way has high impact strength and, moreover, has the characteristic property that it will break up into noncutting fragments. More important for the purposes of the invention, the quenching treatment also imparts to the glass increased flexibility and resiliency. Quenched glass is about five times as resilient as unquenched glass of similar type. It is this particular feature which is taken advantage of according to the invention. The thinner the glass sheet, the more flexible it is. If the mold is made from elements of quenched glass having a uniform thickness on the order of 4 millimeters in the case of positive lens, the mold will readily follow and conform to any shrinkage variations in the material as between the center and periphery of the lens without any separation or breakaway between the mold wall and the resin; but in the case of a negative lens, the procedure described in divisional application Ser. No. 271,109 of the parent application Ser. No. 741,629 must be used, to encourage the mold to follow readily any shrinkage variations. Moreover, owing to its low thickness dimension, such a mold wall will readily dissipate any excess heat generated during polymerization.

The present invention carries further the invention of that copending application, in that it has been also discovered that, to eliminate any distortion undergone by the glass during the quenching treatment, it is desirable to machine the quenched glass molds in two stages. In the first stage, prior to quenching, a glass blank is made and its walls are machine ground and smoothed to prescribed curvature and dimensions. The blank is then quenched as described above, and the mold is then again machine-smoothed to the exact curvature desired, in order to remove the distortion which results from quenching. The active surfaces of the mold, that is, those that contact the cast lens, are then polished to their final optical characteristics.

By the use of a mold thus produced from quenched glass elements, faultless and uniform production output can be obtained, and this is a result that is not achievable by any of the prior art procedures.

Examples of the use of molds produced according to the present invention are given in the accompanying drawing, in which:

FIG. 1 is a temperature chart;
FIG. 2 shows in cross section one embodiment of a mold assembly for making a positive lens; and
FIG. 3 shows in cross section another embodiment of mold according to the present invention, for making a negative lens.

For the purposes of the ensuing exemplary description, it is assumed that the lenses are made from allyl diethylene glycol-2-carbonate, known by the trade name of CR 39, a thermosettable material, with addition thereto of an appropriate catalyst such as isopropyl percarbonate or benzoyl peroxide, polymerizing when slowly and gradually heated to 90° C. It should be distinctly understood, however, that various other thermosetting resins may be used in carrying out the invention.

FIG. 1 illustrates, in the chart A, the heating cycle of the above-specified allyl carbonate and, in chart B, the corresponding shrinkage sustained by the material during polymerization. In both charts the abscissae are time of treatment $t$. It will be apparent that the monomer is first maintained two hours at a temperature of 48° C. thereby causing gelation as indicated at G, with a low contraction of about 4%. The temperature T is progressively raised, first slowly, then more rapidly towards the end of the heating period, up to a final value of 90° C., thereby causing polymerization at P. The polymer is then cooled to 60° C., at which point the mold-stripping operation can be performed as indicated at D.

It will be seen that during the polymerizing process, the material undergoes a contraction R amounting to as much as about 14%.

In order to overcome the objectionable effects of such contraction or shrinkage, molds made according to this invention may be of the type illustrated in FIG. 2. This mold comprises a pair of mold sections 10 and 11 made of quenched glass as described above, the sections being interconnected by an annular seal 12 and held in position by a resilient clamping device 13.

Each element 10 or 11 has parallel faces and is about 4 millimeters in thickness. That face which is to engage the lens is optically finished in accordance with conventional procedure. The seal is made from a plastic composition having a softening curve of such gradual slope as to provide ample compensation for the shrinkage of the thermosetting material occurring as indicated by the curve R.

The mold filled with thermosetting monomer resin 14 is placed in an oven and undergoes the temperature cycle according to curve T in FIG. 1. As the material polymerizes, it simultaneously contracts in accordance with the curve R, and the seal 12 concurrently softens and thus allows the mold walls to move inward to compensate for the contraction of the material at the periphery of the lens. It has been found that the different amount of contraction occurring at the center of the lens is compensated for by the inherent resiliency of the element 10, which yields and deforms in such a way as at all times to ensure that contact is present between the mold walls and the lens.

After the material has polymerized and cooled (point D of the curve), the clamp 13 and the seal 12 are removed and the elements 10 and 11 are moved apart so as to strip the lens from its mold. The resulting lens 14 is ready for use.

The mold in FIG. 2 is of a type designed for molding part-spherical concave-convex lenses in which contraction is a minimum at the periphery adjacent the seal 12 and is a maximum at the center.

A similar arrangement is applicable to part-spherical convex-concave lenses, i.e. negative lenses, as shown in FIG. 3, wherein the same components will be recognized including the quenched glass elements 10 and 11, seal 12 and clamp 13. With this shape of lens, however, the contraction is greatest peripherally and lowest centrally of the lens.

Having described my invention, I claim:

1. A method of manufacturing optical and ophthalmic lenses molded from thermosetting synthetic resin, comprising forming a mold element by removing glass from the surface of a glass blank havng parallel faces and a unform thickness of about 4 millimeters, until the surface of the blank has the curvature of the lenses to be obtained, quenching the blank thus prepared by heating to about 700° C. and projecting relatively cold fluid on the blank thus heated, again removing glass from the surface of the quenched blank until said surface again has said curvature, and using the resulting mold element in the production of lenses.

2. A method of manufacturing optical and ophthalmic lenses molded from thermosetting synthetic resin, comprising forming a mold element by machine grinding and smoothing the surface of a glass blank having parallel faces and a uniform thickness of about 4 millimeters, until the surface of said blank has the curvature of the lenses to be obtained, quenching the blank thus prepared by heating to about 700° C. and projecting relatively cold fluid on the blank thus heated, again machine smoothing the surface of the quenched blank until said surface again has said curvature, and using the resulting mold element in the production of lenses.

References Cited
UNITED STATES PATENTS

| | | | |
|---|---|---|---|
| 1,519,277 | 12/1924 | Taylor | 65—61 |
| 2,342,378 | 2/1944 | Smith | 264—1 |
| 2,890,486 | 6/1959 | Crandon. | |
| 2,991,591 | 7/1961 | Gabor et al. | 65—115 |
| 3,150,950 | 9/1964 | English et al. | 65—114 X |

FOREIGN PATENTS 542,964    7/1957    Canada.

DONALL H. SYLVESTER, *Primary Examiner.*

F. W. MIGA, *Assistant Examiner.*